No. 788,314. Patented April 25, 1905.

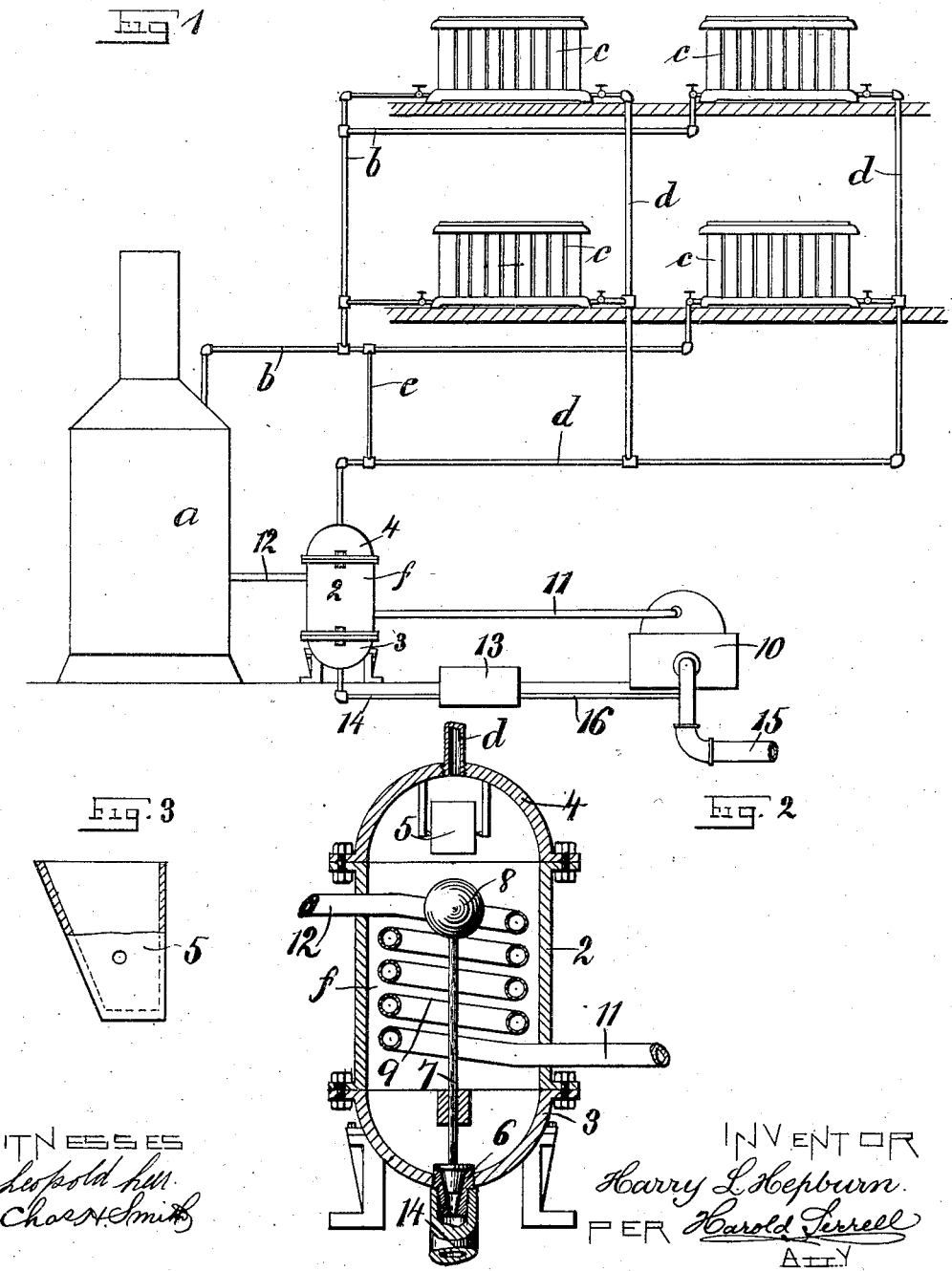

UNITED STATES PATENT OFFICE.

HARRY L. HEPBURN, OF NEW YORK, N. Y.

LIQUID-RETURN SYSTEM.

SPECIFICATION forming part of Letters Patent No. 788,314, dated April 25, 1905.

Application filed August 20, 1904. Serial No. 221,488.

*To all whom it may concern:*

Be it known that I, HARRY L. HEPBURN, a citizen of the United States, residing in the borough of Manhattan, in the city, county, and State of New York, have invented an Improvement in Liquid-Return Systems for Vapor-Generators, of which the following is a specification.

My invention relates to a liquid-return system for vapor-generators, and particularly to a water-return system for steam-generators; and the object thereof is the provision of means for the ready disposal in apparatus of this class of the unavoidable liquid of condensation and entrainment.

In carrying out my invention I employ a generator, supply-pipes leading therefrom, one or more vapor-utilizing devices, a liquid-cooled trap, drip-pipes connecting with the said trap, means within the said trap for receiving and intermittently and automatically discharging the liquid of condensation and entrainment into the said trap, means for discharging the trap automatically, and means for conveying feed-water, and possibly the liquid of condensation, through the trap to the generator.

In the drawings, Figure 1 is a diagrammatic elevation representing my invention. Fig. 2 is a vertical section of the liquid-cooled trap, and Fig. 3 is a partial section and side elevation of the liquid-receptacle employed within the trap.

*a* represents a steam or other generator, and *b* a supply-pipe therefrom and with its branches leading to a series of radiators *c* or other steam-utilizing devices, and *d* the drip or return pipes from the steam-utilizing devices.

*e* represents a drip-pipe connecting the supply-pipe *b* and the main drip-pipe, and *f* is a liquid-cooled trap into which, as shown, the return-pipes are led. The liquid-cooled trap *f* preferably comprises a cylindrical body portion 2 and base and cap members 3 4, respectively, which are connected to the body portion 2 in any suitable manner.

5 represents a receptacle pivotally mounted in suitable supports in the cap member 4 and directly beneath the point of entrance of the drip-pipes *d*. This receptacle 5 is so mounted and weighted that when empty its center of gravity is below its pivot and it remains upright, but when filling its center of gravity rises above its pivot to a point where overbalanced the receptacle turns and becomes automatically self-emptying, righting at once after discharging its contents.

I provide the base member 3 with a discharge-valve 6, having a rod 7, to the end of which is secured a ball-float 8. I also employ a pipe-coil 9, through which the feed to the generator is passed independently of the contents of the trap, which pipe is therefore preferably connected to a suitable feed-pump 10 by a pipe 11, which connects with the lower end of the pipe-coil, while the upper end of the pipe-coil is connected to the generator by means of the pipe connection 12. I may also employ a tank 13, to which the pipe 14 is led from the discharge of the trap, and this tank 13 is preferably connected to the suction 15 of the pump 10 by means of a pipe 16.

In the operation of the apparatus the water or other liquid of condensation is all conveyed to the trap, being first received in the receptacle 5, which when filled to overbalancing empties itself into the body portion proper of the trap, and thence is automatically discharged through the valve 6 by the operation of the rod and float-ball 8, and the comparatively cold feed liquid passing through the coil 9, while appreciably heated, still maintains a relatively low temperature within the trap at all times.

It is to be understood that the drip-pipe *e* may be connected directly to the trap *f*, that the drip-pipes *d* need not necessarily be connected to the trap *f*, and that instead of returning the discharge from the trap to the pump-suction the discharge may be led to a sewer or elsewhere, as found expedient.

I claim as my invention—

1. The combination with a generator, of supply-pipes leading therefrom, one or more vapor-utilizing devices, a liquid-cooled trap, drip-pipes leading from the vapor-utilizing devices and the supply-pipes to said trap, and means for passing the generator-feed through said trap and cooling the same independently of the contents of the trap.

2. The combination with a generator, of a supply-pipe leading therefrom, one or more vapor-utilizing devices, a liquid-cooled trap, drip-pipes leading to said trap, a drip-pipe leading from the said supply-pipe to the said trap, means within said trap for receiving and discharging the liquid of condensation and entrainment into said trap, and means for automatically discharging said trap.

3. The combination with a generator, of a supply-pipe leading therefrom, one or more vapor-utilizing devices, a liquid-cooled trap, a self-emptying pivotally-mounted receptacle therein, a discharge-valve, a rod and ball-float within said trap and connected to said discharge-valve, and a pipe-coil also within said trap and through which the cooling fluid is conveyed, drip-pipes leading to said trap and a drip-pipe leading from the said supply-pipe to the said trap.

4. The combination with a generator, of a supply-pipe leading therefrom, one or more vapor-utilizing devices, a liquid-cooled trap, a self-emptying pivotally-mounted receptacle within the same, a discharge-valve, a rod and ball-float within said trap and connected to said discharge-valve, a pipe-coil also within said trap and through which the cooling fluid is conveyed, drip-pipes leading from vapor-utilizing devices to said trap, a drip-pipe leading from the said supply-pipe to the said trap, a tank, a feed-pump, and connections from the said trap to said tank and from the tank to the feed-pump suction.

5. The combination with a generator, of a supply-pipe leading therefrom, one or more vapor-utilizing devices, a liquid-cooled trap, drip-pipes leading to said trap, a drip-pipe leading from the said supply-pipe to the said trap, and means for automatically discharging said trap.

6. The combination in a vapor generating and utilizing system, of a liquid-cooled trap, a connection therefrom to the vapor-utilizing devices, and means for passing the feed-supply for the generator through said trap independent of the contents of the trap.

7. The combination in a vapor generating and utilizing system, of a liquid-cooled trap, a connection therefrom to the vapor-utilizing devices, means for automatically delivering the condensed vapor into the trap, and means for passing the feed-supply for the generator through said trap independent of the contents of the trap.

8. The combination in a vapor generating and utilizing system, of a liquid-cooled trap, a connection therefrom to the vapor-utilizing devices, means for automatically delivering the condensed vapor into the trap, means for passing the feed-supply for the generator through said trap independent of the contents of the trap, and means for removing the contents of the trap and passing the same with the feed-supply to the generator.

Signed by me this 29th day of July, 1904.

HARRY L. HEPBURN.

Witnesses:
GEO. T. PINCKNEY,
S. T. HAVILAND.